(12) United States Patent
Jones, Jr.

(10) Patent No.: US 6,624,816 B1
(45) Date of Patent: Sep. 23, 2003

(54) METHOD AND APPARATUS FOR SCALABLE IMAGE PROCESSING

(75) Inventor: Morris E. Jones, Jr., Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/393,596

(22) Filed: Sep. 10, 1999

(51) Int. Cl.⁷ .................. G06F 15/16; G06F 3/00; G06F 1/26
(52) U.S. Cl. .............. 345/503; 345/522; 710/15; 710/18; 712/229; 713/320; 713/324
(58) Field of Search .................. 702/63, 132; 710/15, 710/16, 18; 712/229; 713/320, 323, 324, 330, 340; 345/502, 503, 522

(56) References Cited

U.S. PATENT DOCUMENTS

| | | | |
|---|---|---|---|
| 4,233,601 A | 11/1980 | Hankins et al. | 340/703 |
| 4,385,293 A | 5/1983 | Wisnieff | 340/793 |
| 4,476,464 A | 10/1984 | Hobbs | 340/731 |
| 4,706,077 A | 11/1987 | Roberts et al. | 340/728 |
| 4,739,313 A | 4/1988 | Oudshoorn et al. | 340/703 |
| 4,862,156 A | 8/1989 | Westberg et al. | 340/747 |
| 4,956,638 A | 9/1990 | Larky et al. | 340/701 |
| 5,016,000 A | 5/1991 | Bugg | 340/731 |
| 5,072,411 A | 12/1991 | Yamaki | 395/162 |
| 5,097,518 A | 3/1992 | Scott et al. | 382/47 |
| 5,111,194 A | 5/1992 | Oneda | 340/793 |
| 5,113,455 A | 5/1992 | Scott | 382/47 |
| 5,335,295 A | 8/1994 | Ferracini et al. | 382/47 |
| 5,392,437 A * | 2/1995 | Matter et al. | 713/324 |
| 5,504,920 A | 4/1996 | Biggs et al. | 395/800 |
| 5,559,525 A | 9/1996 | Zenda | 345/1 |
| 5,560,022 A * | 9/1996 | Dunstan et al. | 710/301 |
| 5,623,647 A * | 4/1997 | Maitra | 709/100 |
| 5,719,800 A * | 2/1998 | Mittal et al. | 713/321 |
| 5,724,067 A | 3/1998 | Atchley et al. | 345/141 |
| 5,745,762 A | 4/1998 | Celi, Jr. et al. | 395/681 |
| 5,752,010 A | 5/1998 | Herbert | 395/509 |
| 5,799,204 A | 8/1998 | Pesto, Jr. | 395/830 |
| 5,822,599 A * | 10/1998 | Kidder et al. | 345/212 |
| 5,860,016 A * | 1/1999 | Nookala et al. | 713/300 |
| 5,874,937 A | 2/1999 | Kesatoshi | 345/127 |
| 5,926,166 A * | 7/1999 | Khederzadeh et al. | 345/428 |
| 5,978,923 A * | 11/1999 | Kou | 713/320 |
| 5,996,084 A * | 11/1999 | Watts | 713/322 |
| 6,061,094 A | 5/2000 | Maietta | 348/446 |
| 6,079,025 A * | 6/2000 | Fung | 713/320 |
| 6,272,642 B2 * | 8/2001 | Pole et al. | 713/300 |
| 6,397,343 B1 * | 5/2002 | Williams et al. | 713/501 |

* cited by examiner

*Primary Examiner*—Ulka J. Chauhan
(74) *Attorney, Agent, or Firm*—Thelen Reid & Priest, LLP; John P. Schaub

(57) ABSTRACT

An apparatus for scalable image processing includes a display, multiple graphics functional units and a mode selector. Each of the graphics functional units has a configuration of a predetermined type to control the display. The mode selector determines which combination of graphics functional units controls the display. A method for scalable image processing includes monitoring at least one parameter, determining whether to switch from one graphics functional unit configuration to a new graphics functional unit configuration based upon one or more of the parameters, and switching to the new graphics functional unit configuration.

4 Claims, 4 Drawing Sheets

METHOD AND APPARATUS FOR SCALABLE IMAGE PROCESSING

BACKGROUND OF THE INVENTION

1. Field of the Invention

The present invention relates to image processing. More particularly, the present invention relates to a method and apparatus for scalable image processing employing multiple graphics functional units.

2. Background

Computer graphics technology has advanced at a rapid pace in recent years. As each new computer graphics system is introduced, competitive forces and the desire to improve upon prior systems have resulted in graphics functional units with graphics feature sets more complex than the ones they replaced. Advanced features in many current graphics functional units include video overlay, scaling, panel fitting in VGA modes, 3-D graphics and support for 32-bits-per-pixel (BPP). While the enhanced feature sets greatly improve graphics processing capability, the additional logic increases power requirements. The additional logic also generates more heat, thus requiring more advanced heat dissipation systems.

Although many of the advanced features included in modern graphics functional units are either required for, or enhance the performance of modern application programs, most "Business graphics" applications require graphics functional units that have a relatively small graphics feature set. Business graphics applications typically include email, spreadsheet and word processing applications.

An improvement in the scalability of image processing is made possible using multiple graphics functional units. In such a system, the graphics functional unit that the user wants to use is selected by operating a switch. Alternatively, the graphics functional unit may be selected via an input device that the user operates to execute a setup program or the like after the system has been turned on.

Some conventional computer systems allow an optional graphics functional unit to be connected, in addition to the built-in graphics functional unit, in a manner such that the optional graphics functional unit is located either inside or outside the main body of the computer system. Even if an optional graphics functional unit is located within the main body, the built-in controller is typically selected prior to the optional graphics functional unit. Moreover, the graphics functional unit may typically be changed only during initialization. These approaches typically require rebooting the computer whenever a graphics functional unit is changed.

The above approaches are poorly suited for many uses. Many computer users infrequently execute applications requiring advanced graphics features. Other computer users may switch between applications requiring a variety of graphics features within a short amount of time. Rebooting a computer in order to switch a graphics functional unit is unacceptably burdensome for the computer user.

Accordingly, a need exists in the prior art for a method and apparatus for scalable image processing that reduces power consumption and increases battery life when a graphics functional unit system is operated in business graphics mode. In addition, a need exists to provide such a system that adaptively changes graphics modes according to current operating conditions.

BRIEF DESCRIPTION OF THE INVENTION

An apparatus for scalable image processing includes a display, multiple graphics functional units and a mode selector. Each of the graphics functional units has a configuration of a predetermined type to control the display. The mode selector determines which combination of graphics functional units controls the display. A method for scalable image processing includes monitoring at least one parameter, determining whether to switch from one graphics functional unit configuration to a new graphics functional unit configuration based upon one or more of the parameters, and switching to the new graphics functional unit configuration.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to image processing. More particularly, the present invention relates to a method and apparatus for scalable graphics processing. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, a plurality of graphics functional unit configurations is employed to control a display. Each graphics functional unit configuration comprises at least one graphics functional unit and the feature sets of each graphics functional unit may differ. The graphics functional unit configurations may be selected according to many factors, including thermal management goals, power management goals and current graphics requirements.

The present invention decreases battery power consumption, thereby increasing the amount of time between battery recharges. The present invention also enhances thermal control properties, thus increasing graphics functional unit life.

Figure 1:
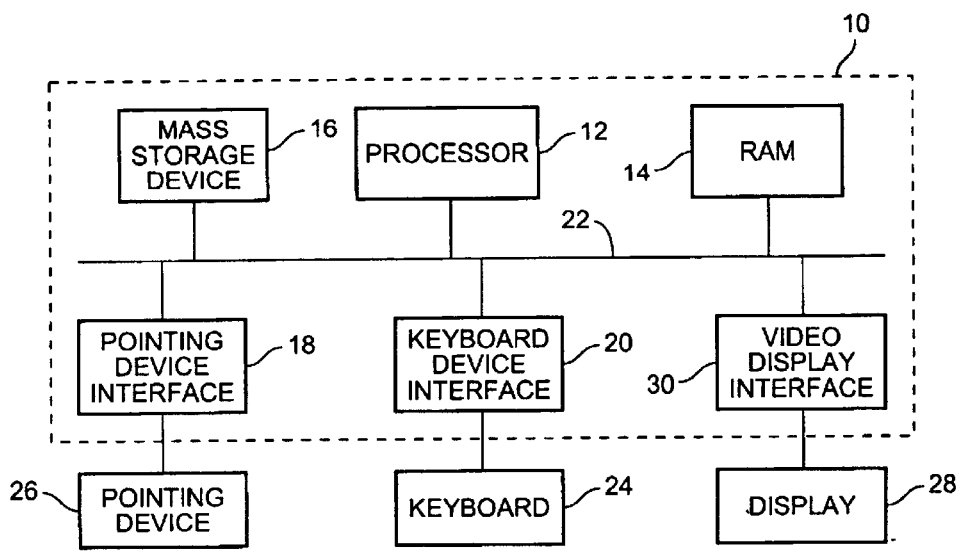
FIG. 1 is a block diagram that illustrates a computer system according to one embodiment of the present invention.

Turning now to FIG. 1, a block diagram showing a computer system according to one embodiment of the present invention is presented. The computer system comprises a core unit 10, including a first processor 12, a random access memory (RAM) 14, a mass storage device 16, a pointing device interface 18 and a keyboard device interface 20, all connected via a bus 22. A keyboard 24 is connected to the core unit 10 via the keyboard device interface 20. A pointing device 26 is connected to the core unit 10 via the pointing device interface 18. The core unit 10 is also connected to a display device 28 via a video display interface 30.

In operation, the first processor 12 processes program instructions stored in RAM 14 and mass storage device 16. The pointing device interface 18 and the keyboard device interface 20 allow manually entered data via the pointing device 26 and the keyboard 24, respectively. The video display interface 30 accepts digital video data from the first processor 12. The video display interface 30 puts the digital video data in a format acceptable to the display device 28. The video display interface 30 contains two or more graphics functional units having a configuration of a predetermined type to control what is displayed on the display device 28.

Figure 2:
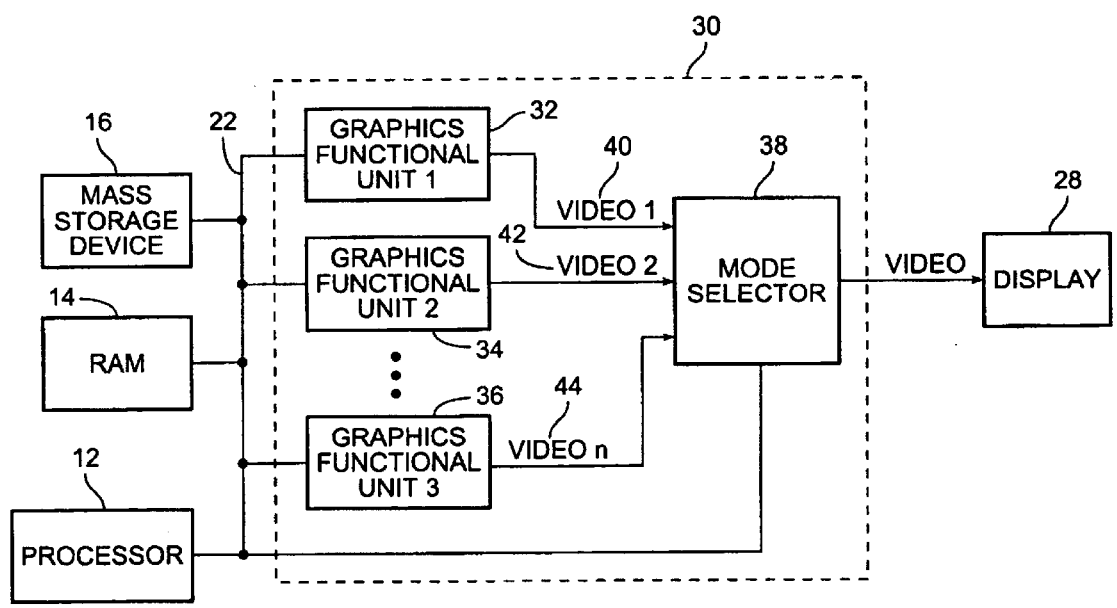
FIG. 2 is a block diagram that illustrates a video display interface in accordance with one embodiment of the present invention.

Turning now to FIG. 2, a block diagram illustrating the video display interface 30 in accordance with the present invention is presented. The video display interface 30 comprises a plurality of graphics functional units, 32, 34 and 36 and a mode selector 38, all connected via bus 22.

In operation, the graphics functional units 32, 34 and 36 accept digital video data from RAM 14 or mass storage device 16 under the control of the first processor 12. The graphics functional units 32, 34 and 36 put the digital video data in a format acceptable to the display device 28. Video outputs 40, 42 and 44 of graphics functional units 32, 34 and 36 are presented to the input of mode selector 38. Mode selector 38 determines which outputs to select for output to display 28. The mode selector 38 may select multiple video outputs, in which case the output is merged before output to display 28.

Figure 3:
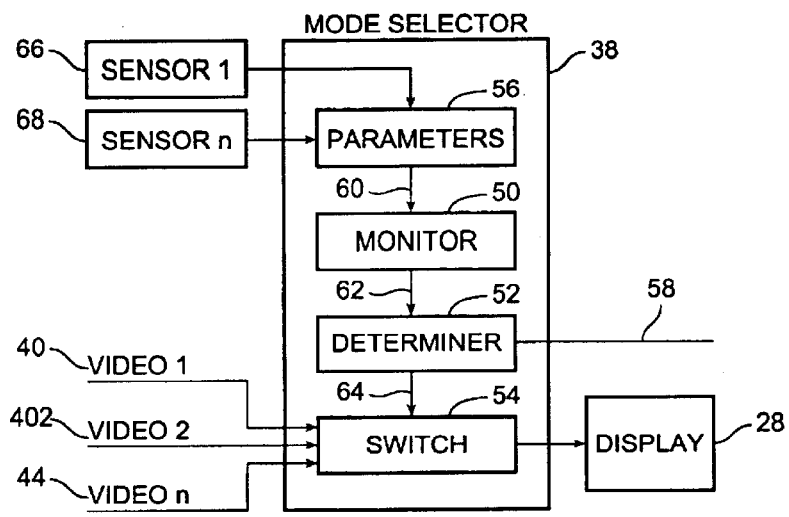
FIG. 3 is a block diagram that illustrates a mode selector in accordance with one embodiment of the present invention.

Turning now to FIG. 3, a block diagram of the mode selector 38 according to one embodiment of the present invention is presented. The mode selector 38 comprises a monitor 50, a determiner 52 and a switch 54. At least one parameter is stored in a memory 56. The monitor 50 periodically checks the memory 56. The determiner 52, which is responsive to a signal 58, ascertains what graphics functional unit output 40, 42 or 44 or combination of graphics functional unit outputs should be selected, based upon a signal from the monitor 62 and said signal 58. The switch 54 selects graphics functional unit output according to a signal from the determiner 64. The graphics functional unit output selected by the switch 54 is presented to display 28.

According to one embodiment of the present invention, the contents of memory 56 are under program control. A software application writes to the memory 56 to change the graphics functional unit configuration. According to another embodiment, memory 56 contains sensor readings 66, 68. By way of example, these sensor readings 66, 68 may be from battery power sensors or thermistors.

Figure 4:
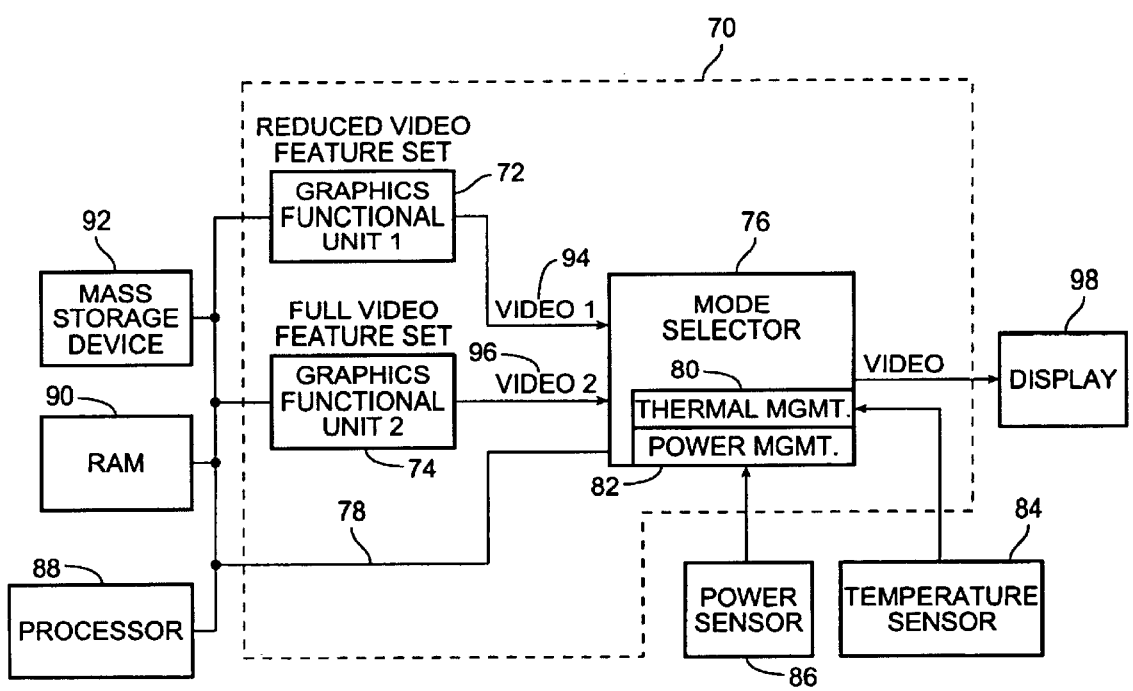
FIG. 4 is a block diagram that illustrates a video display interface having two graphics functional units in accordance with one embodiment of the present invention.

Turning now to FIG. 4, a block diagram of one embodiment of the present invention is presented. The video display interface 70 comprises a first graphics functional unit 72, a second graphics functional unit 74 and a mode selector 76, all connected via bus 78. The first graphics functional unit 72 comprises a first plurality of graphics processing circuits, supporting a reduced graphics feature set. This controller supports typical business mode graphics applications, such as spreadsheets, email applications and word processors. The second graphics functional unit 74 comprises a second plurality of graphics processing circuits, supporting a full graphics feature set. This controller supports graphics applications requiring more complex graphics processing, such as 3-D graphics, TV input and TV output.

The use of the terms "full graphics feature set" and "reduced graphics feature set" is not intended to be limiting in any way. Those of ordinary skill in the art will recognize that the present invention may be applied to combinations of two or more graphics functional units having the same or different graphics feature sets.

According to one embodiment of the present invention, the mode selector 76 contains a thermal management unit 80. The thermal management unit 80 is coupled to at least one temperature sensor 84. The thermal management unit 80 provides a parameter used by the mode selector 76 to determine which graphics functional unit configuration should be selected. The thermal management unit 80 enables changing to a graphics functional unit configuration that generates relatively less heat when a first thermal threshold is reached. The thermal management unit 80 also enables changing back to another graphics functional unit configuration when a second thermal threshold has been reached.

According to one embodiment of the present invention, the mode selector 76 contains a power management unit 82. The power management unit 82 is coupled to at least one battery power sensor 86. The power management unit 82 provides a parameter used by the mode selector 76 to determine which graphics functional unit configuration should be selected. The power management unit 82 enables changing to a graphics functional unit configuration that consumes relatively less battery power when a first battery power threshold is reached. The power management unit 82 also enables changing back to another graphics functional unit configuration when a second battery power threshold has been reached.

According to another embodiment of the present invention, the mode selector 76 includes both a power management unit 82 and a thermal management unit 80. Both the power management unit 82 and the thermal management unit 80 cooperate to switch to more favorable graphics functional unit configurations when predetermined thresholds are met.

According to another embodiment of the present invention, the power management unit 82 and the thermal management unit 80 are included within the first processor. Thermal management information and power management control information are sent by the first processor 88 to the mode selector 76 via bus 78. Those of ordinary skill in the art will recognize that thermal management unit 80 and the power management unit 82 may be located elsewhere as well.

According to another embodiment of the present invention, the first graphics functional unit 72 includes an eight bits-per-pixel (BPP) mode and a sixteen BPP mode. These two modes are sufficient for typical business graphics applications.

Refreshing again to FIG. 2, another embodiment of the present invention is presented. According to this embodiment, cursor functions and other graphics functions are offloaded to the first processor 12. Offloading these functions to the first processor 12 allows for a reduced feature set graphics functional unit without a noticeable effect on graphics processing performance. In operation, first processor 12 provides video data to the mode selector 38 via bus 30. The mode selector 38 selects video data from the first processor 38, graphics functional unit 32, 34 or 36, or some combination thereof. Those of ordinary skill in the art will readily recognize that the offloaded functions may be off-loaded to other processors on a computer system as well.

Figure 5:
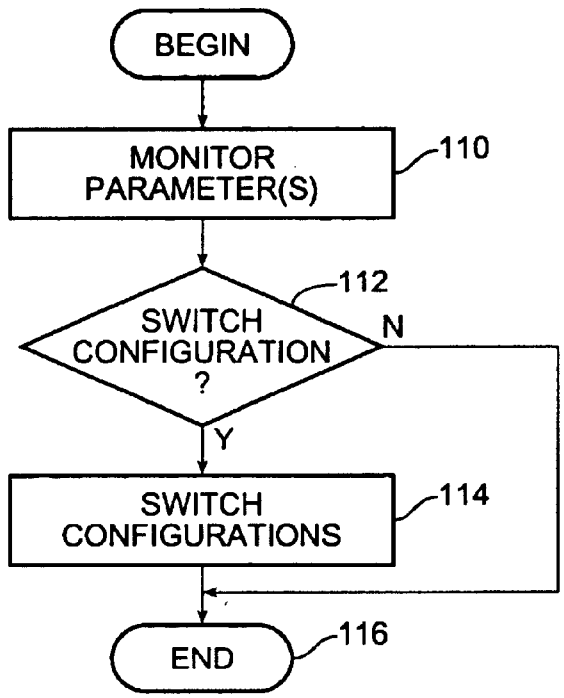
FIG. 5 is a flow diagram that illustrates scalable image processing in accordance with the present invention.

Turning now to FIG. 5, a method for scalable graphics processing in accordance with one embodiment of the present invention is presented. At reference numeral 110, at least one parameter is monitored. The parameter may represent a sensor reading, or it may be a value written by a software application to initiate a change in graphics functional unit configurations. At reference numeral 112, a check is made to determine whether the graphics functional unit configuration should be switched. If the graphics functional unit configuration should be switched, it is done at reference numeral 114. If the graphics functional unit configuration should not be switched, the processing terminates at reference numeral 116.

Figure 6:
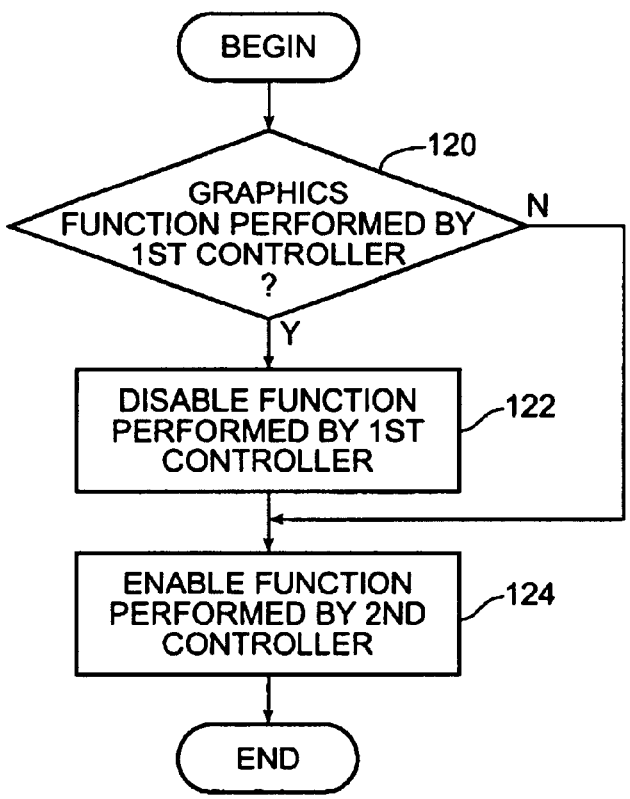
FIG. 6 is a flow diagram that illustrates switching graphics functional unit configurations in accordance with one embodiment of the present invention.

Turning now to FIG. 6, a method for switching graphics functional unit configurations in accordance with one embodiment of the present invention is presented. This corresponds with reference numeral 112 of FIG. 5. At reference numeral 120, a check is made to determine whether a particular graphics function is being performed by a first graphics functional unit. By way of example, the graphics function may include video overlay, scaling, panel fitting in VGA modes, 3-D graphics, TV input or TV output. If the first graphics functional unit is performing the function, the performance of the function by the first graphics functional unit is disabled at reference numeral 122. If the first graphics functional unit is not performing the function, execution continues at reference numeral 124. At reference numeral 124, performance of the particular graphics function by a second graphics functional unit is enabled.

Figure 7:
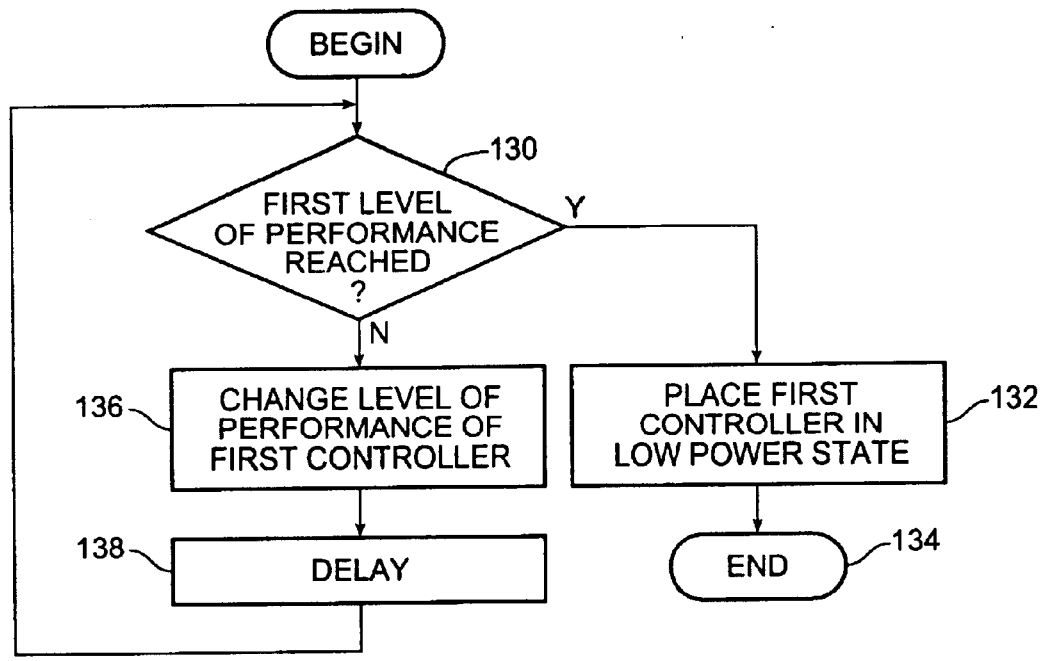
FIG. 7 is a flow diagram that illustrates disabling a graphics functional unit in accordance with one embodiment of the present invention.

Turning now to FIG. 7, a method for disabling a graphics functional unit in accordance with one embodiment of the present invention is presented. This corresponds with reference numeral 122 of FIG. 6. At reference numeral 130, a check is made to determine whether a first level of performance has been reached. If the level of performance has been reached, the first controller is placed in a low power state at reference numeral 133 and execution terminates at reference numeral 134. If the first level of performance has not been reached, the level of performance of the first graphics functional unit is changed at reference numeral 136. At reference numeral 138, the process of disabling a graphics functional unit is delayed for a first predetermined amount of time. After the time for delay has elapsed, execution continues at reference numeral 130.

Figure 8:
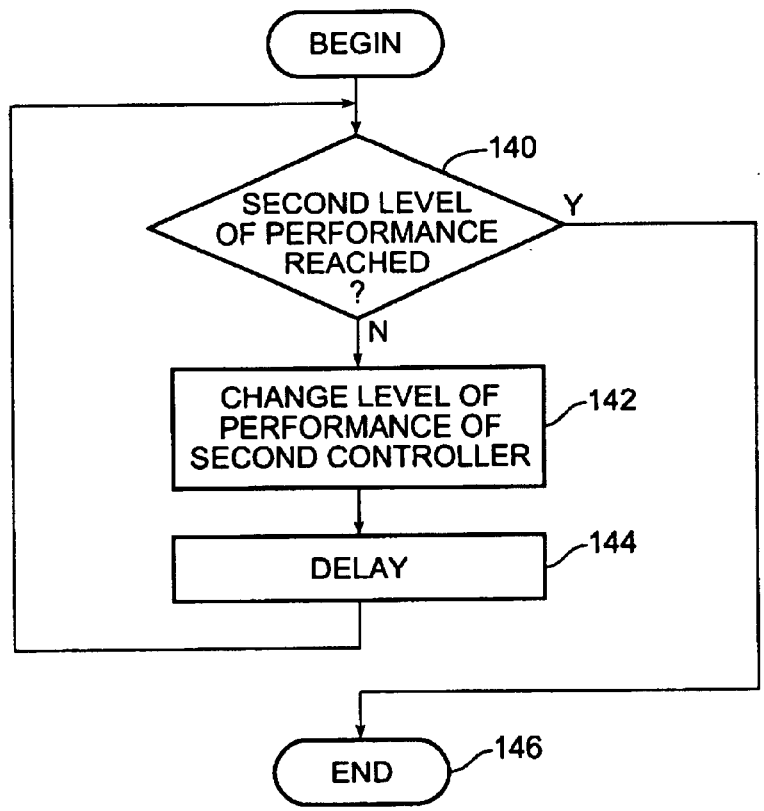
FIG. 8 is a flow diagram that illustrates enabling a graphics functional unit in accordance with one embodiment of the present invention.

Turning now to FIG. 8, a method for enabling a graphics functional unit in accordance with one embodiment of the present invention is presented. This corresponds with reference numeral 124 of FIG. 6. At reference numeral 140, a check is made to determine whether a second level of performance has been reached. If the second level of performance has been reached, execution terminates at reference numeral 146. If the level of performance has not been reached, the level of performance of the first controller is changed at reference numeral 142. At reference numeral 144, the process of enabling a graphics functional unit is delayed for a second predetermined amount of time. After the time for delay has elapsed, execution continues at reference numeral 140.

According to one embodiment of the present invention, switching from one graphics functional unit configuration to another is performed in a manner that minimizes perceptible changes in graphics performance. The relative performance capabilities of the graphics functional unit configuration currently in use and the graphics functional unit configuration being switched to are taken into account when determining how to change the performance of the graphics functional unit configurations in the process of switching over to a new graphics functional unit configuration. Likewise, the amount of time between successive changes in graphics functional unit performance is selected such that perceptible changes in performance are minimized. Those of ordinary skill in the art will recognize that the ability to perceive changes in graphics performance varies directly with the speed at which the performance is changed.

In one example of the above embodiment, a switch is made from a first graphics functional unit configuration having a high performance level to a second configuration having a low performance level, the performance of the first configuration is reduced over time until the performance level of the first configuration approximates the maximum performance level of the second configuration. At this point, the first configuration is placed in a low power state and the second configuration is enabled.

Accordingly, switching from a first graphics functional unit configuration having a low performance level to a second configuration having a high performance level is performed in a like fashion. In this case, first configuration is put into a low power state and the second configuration begins processing at a reduced performance level approximating the performance level of the first configuration. The performance level of the second configuration is gradually increased to the desired level, thus reducing perceptible changes in performance.

According to another embodiment of the present invention, at least one of the graphics functional units in the first graphics functional unit configuration is not in the second graphics functional unit configuration. Upon switching to the second graphics functional unit configuration, the graphics functional unit in the first graphics functional unit configuration is placed into a low power state. This low power state includes the "off" state.

According to another embodiment of the present invention, there is one graphics functional unit in the first graphics functional unit configuration and one graphics functional unit in the second graphics functional unit configuration. The first graphics functional unit 72 supports a reduced graphics feature set. This controller supports typical business mode graphics applications, which typically require relatively simple graphics circuitry. Some typical business mode applications include spreadsheets, email applications and word processors. The second graphics functional unit 74 supports a full graphics feature set. This controller supports graphics applications requiring relatively complex graphics processing. These applications include video overlay, 3-D graphics, TV input and TV output.

According to another embodiment of the present invention, graphics functional unit configurations are changed according to a battery power budget. The battery power consumption rate and the amount of battery power remaining are monitored. When the amount of battery power remaining drops below a predetermined level, the graphics functional unit configuration is changed to one that consumes less power. The rate at which the change to the new configuration occurs may vary according to the current rate of battery power consumption. For instance, if the rate of power consumption is relatively high when the amount of power remaining drops below a predetermined level, the change to the new configuration should occur at a relatively high rate. Conversely, if the rate of power consumption is relatively low when the amount of power remaining drops below a predetermined level, the change to the new configuration should occur at a relatively low rate.

Likewise, when battery power rises above a predetermined level, the graphics functional unit configuration may be changed to one better suited to current graphics processing needs. This may occur, for instance, when a laptop computer is connected to A/C power and the battery is recharged.

According to another embodiment of the present invention, graphics functional unit configurations are changed according to a thermal budget. At least one temperature sensor is monitored. When the temperature rises above a predetermined level, the graphics functional unit configuration is changed to one that generates less heat. Likewise, when the temperature subsequently falls below a predetermined level, the video configuration may be changed to one better suited to current graphics processing needs.

According to another embodiment of the present invention, the graphics functional unit configurations are changed according to the graphics requirements of the current graphics mode. The graphics functional unit configuration is switched between a business graphics functional unit configuration and an enhanced graphics functional unit configuration. The business graphics configuration may be used when applications with relatively low graphics requirements are being executed. These applications include spreadsheet, email and word processing applications. The enhanced graphics configuration may be used when applications with relatively high graphics requirements are being executed. These applications include 3-D graphics, TV input and TV output.

The description of the parameters used to switch a graphics functional unit configuration is not intended to be limiting in any way. Those of ordinary skill in the art will recognize that other parameters or combination of parameters may be used as well.

According to a presently preferred embodiment, the present invention may be implemented in software or firmware, as well as in programmable gate array devices, Application Specific Integrated Circuits (ASICs), and other hardware.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A computer system comprising:
    a bus;
    a processor coupled to said bus;
    a display;
    a plurality of graphics functional units coupled to said bus, each of said graphics functional units having a configuration of a predetermined type to control said display, said plurality of graphics functional units further comprising:
        a first graphics functional unit to support a reduced graphics feature set, said reduced feature set comprising a first plurality of graphics processing circuits; and
        a second graphics functional unit to support a full graphics feature set, said full graphics feature set comprising a second plurality of graphics processing circuits, said processor configured to execute instructions to perform the functions provided by at least one of said second plurality of graphics processing circuits when said first graphics functional unit controls said display;
    a mode selector to determine which of said graphics functional units controls said display; and
    a storage device coupled to said bus, said storage device to store video data sent to said plurality of graphics functional units via said bus under the control of said processor.

2. A computer system, comprising:
    a bus;
    a processor coupled to said bus;
    a display;
    a plurality of graphics functional units coupled to said bus, each of said graphics functional units having a configuration of a predetermined type to control said display, said plurality of graphical functional units further comprising:
        a first graphics functional unit to support a reduced graphics feature set, said reduced feature set comprising a first plurality of graphics processing circuits; and
        a second graphics functional unit to support a full graphics feature set, said full graphics feature set comprising a second plurality of graphics processing circuits;
    a mode selector to determine which of said graphics functional units controls said display, said mode selector further comprising:
        a monitor to periodically check at least one parameter;
        a determiner responsive to said at least one parameter to ascertain which graphics functional unit should be selected; and
        a switch responsive to said determiner to select a graphics functional unit, said processor configured to execute instructions to perform the functions provided by at least one of said second plurality of graphics processing circuits when said first graphics functional unit controls said display; and
    a storage device coupled to said bus, said storage device to store video data sent to said plurality of graphics functional units via said bus under the control of said processor.

3. A program storage device readable by a machine, tangibly embodying a program of instructions executable by the machine to perform scalable graphics processing, comprising:
    a first module comprising code for causing a machine to monitor at least one parameter,
    a second module comprising code for causing a machine to determine whether to switch from a first graphics functional unit configuration to a second graphics functional unit configuration based upon said at least one parameter; and a third module comprising code for causing a machine switch to said second graphics functional unit configuration, said third module further comprising:
  a fourth module comprising code for causing a machine to determine whether a graphics processing function is being performed by said first graphics functional unit configuration;
a fifth module comprising code for causing a machine to disable said graphics processing function by said first graphics functional unit configuration, said fifth module further comprising:
  a seventh module comprising code for causing a machine to determine whether said graphics processing function being performed by said first graphics functional unit configuration has reached a first predetermined level of performance;
  an eighth module comprising code for causing a machine to place said first graphics functional unit configuration in a low power state when said first predetermined level of performance has been reached;
  a ninth module comprising code for causing a machine to change the level of performance of said graphics processing function being performed by said first graphics functional unit configuration when said first graphics functional unit configuration when said first predetermined level of performance has not been reached; and
  a tenth module comprising code for causing a machine to delay for a first predetermined amount of time before causing said machine to repeat execution of said fifth module; and
a sixth module comprising code for causing a machine to enable said graphics processing function by said second graphics functional unit configuration, said sixth module further comprising:
  an eleventh module comprising code for causing a machine to determine whether said graphics processing function being performed by said second graphics functional unit configuration has reached a second predetermined level of performance;
  a twelfth module comprising code for causing a machine to change the level of performance of said graphics processing function being performed by said second graphics functional unit configuration when said second predetermined level of performance has not been reached; and
  a thirteenth module comprising code for causing a machine to delay for a second predetermined amount of time before causing said machine to repeat execution of said sixth module, said first predetermined level of performance relative to the performance capabilities of said second graphics functional unit configuration, said second predetermined level of performance relative to the performance capabilities of said first graphics functional unit configuration, said changing the level of performance of said first graphics functional unit configuration and said delaying for a first predetermined amount of time selected to minimize perceptible changes in performance, said changing the level of performance of said second graphics functional unit configuration and said delaying for a second predetermined amount of time selected to minimize perceptible changes in performance.

4. A method for scalable image processing, comprising:
monitoring at least one parameter;
determining whether to switch from a first graphics functional unit configuration to a second graphics functional unit configuration based upon said at least one parameter; and
switching to said second graphics functional unit configuration, said switching further comprising:
  determining whether a graphics processing function is being performed by said first graphics functional unit configuration;
  disabling said graphics processing function by said first graphics functional unit configuration, said disabling further comprising:
    determining whether said graphics processing function being performed by said first graphics functional unit configuration has reached a first predetermined level of performance;
    placing said first graphics functional unit configuration in a low power state when said first predetermined level of performance has been reached;
    changing the level of performance of said graphics processing function being performed by said first graphics functional unit configuration when said first predetermined level of performance has not been reached; and
    delaying for a first predetermined amount of time before repeating said disabling; and
  enabling said graphics processing function by said second graphics functional unit configuration, said enabling further comprising:
    determining whether said graphics processing function being performed by said second graphics functional unit configuration has reached a second predetermined level of performance;
    changing the level of performance of said graphics processing function being performed by said second graphics functional unit configuration when said second predetermined level of performance has not been reached; and
    delaying for a second predetermined amount of time before repeating said enabling, said first predetermined level of performance is relative to the performance capabilities of said second graphics functional unit configuration, said second predetermined level of performance is relative to the performance capabilities of said first graphics functional unit configuration, said changing the level of performance of said first graphics functional unit configuration and said delaying for a first predetermined amount of time are selected to minimize perceptible changes in performance, said changing the level of performance of said second graphics functional unit configuration and said delaying for a second predetermined amount of time are selected to minimize perceptible changes in performance.

* * * * *

UNITED STATES PATENT AND TRADEMARK OFFICE
CERTIFICATE OF CORRECTION

PATENT NO. : 6,624,816 B1
DATED : September 23, 2003
INVENTOR(S) : Morris E. Jones, Jr.

It is certified that error appears in the above-identified patent and that said Letters Patent is hereby corrected as shown below:

<u>Column 8,</u>
Line 61, replace "," with -- ; --.

Signed and Sealed this

Sixteenth Day of March, 2004

JON W. DUDAS
*Acting Director of the United States Patent and Trademark Office*